R. F. BOWER.
ROLLER BEARING.
APPLICATION FILED MAY 3, 1911.
1,125,452.
Patented Jan. 19, 1915.
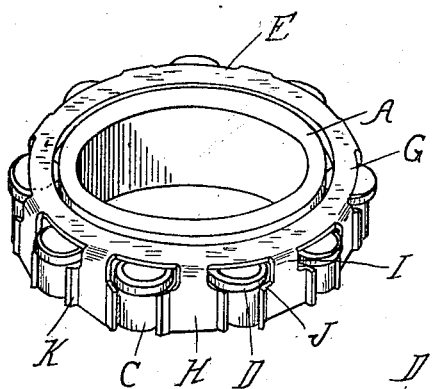
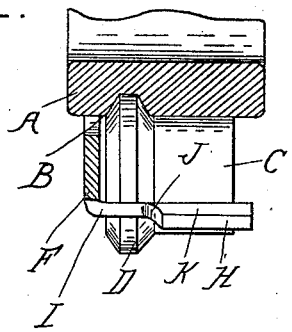
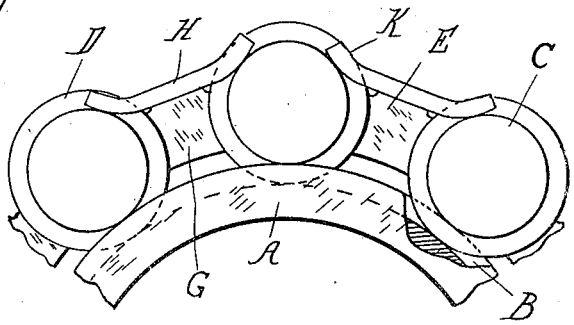
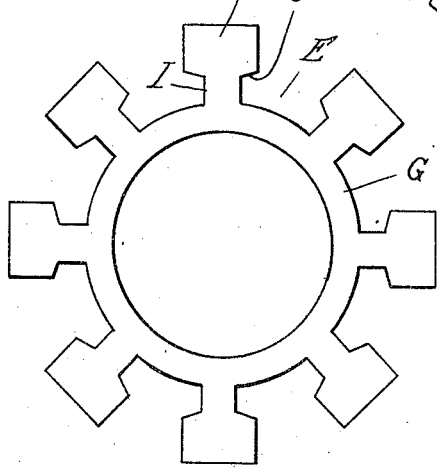
Witnesses
W. K. Ford
J. B. Belknap
Inventor
Robert F. Bower
By Whitmore Whitmore

UNITED STATES PATENT OFFICE.

ROBERT F. BOWER, OF DETROIT, MICHIGAN, ASSIGNOR TO BOWER ROLLER BEARING COMPANY, OF DETROIT, MICHIGAN, A CORPORATION OF MICHIGAN.

ROLLER-BEARING.

1,125,452.  Specification of Letters Patent.  Patented Jan. 19, 1915.

Application filed May 3, 1911. Serial No. 624,840.

*To all whom it may concern:*

Be it known that I, ROBERT F. BOWER, a citizen of the United States of America, residing at Detroit, in the county of Wayne and State of Michigan, have invented certain new and useful Improvements in Roller-Bearings, of which the following is a specification, reference being had therein to the accompanying drawings.

The invention relates to roller bearings of that type in which the rolls are subjected to both radial and end-thrust, and the invention consists in the means employed for spacing and retaining the rolls, and further in features of the construction as hereinafter set forth.

In the drawings,—Figure 1 is a perspective view of the bearing; Fig. 2 is a cross section therethrough; Fig. 3 is an end elevation; Fig. 4 is a plan of the blank from which the spacer is formed.

A is the annular bearing or recess around which the rolls travel and which is provided with a groove B.

C are the rolls surrounding the bearing A each being provided with a flange D for engaging the groove B, the faces of said flange and groove being preferably beveled.

For suitably spacing the rolls and retaining the same in relative position, a spacer member E is employed. This as shown in Fig. 4 may be formed from a flat blank of sheet metal having a ring portion G and outwardly extending lugs H connected to the ring by necks I of lesser width. In assembling the bearing the rolls are placed about the member A with their flanges D in engagement with the groove B. The member E is then placed with the ring G surrounding the member A after which the lugs H are bent at the point of juncture between the necks I and ring, into a position extending at substantially right angles to the plane of the ring G. When the lugs are thus bent their opposite edges will contact with the outer faces of the rolls, while the shoulders J bearing against the flanges D will prevent endwise disengagement of the lugs from the rolls and hold the axes thereof parallel to the axis of the bearing. The lugs H are also preferably bent at their opposite edges as indicated at K so as to form a bearing surface tangent to the roll.

In operation the retainer F constructed as described, will hold the rolls properly spaced and in alinement in engagement with the bearing member A and permit of engaging the assembly with the coöperating annular bearing by an endwise movement.

What I claim as my invention is:

1. In a roller bearing, the combination with a race member having an annular parallel portion and an adjacent annular groove, of rolls spaced about said member each having a parallel portion engaging the parallel portion of said race member and an enlargement engaging said groove, and a retainer comprising a ring adjacent to the ends of said rolls, having a bearing face therefor and bent lugs extending between said rolls of greater width than the minimum space between adjacent rolls and provided with cut away or contracted necks providing clearance for said enlargements, and shoulders opposed to the bearing face of said ring engaging the inner faces of said enlargements and holding the same against said ring.

2. In a roller bearing, an annular race-member having an annular groove therein, a series of rolls arranged around said race member each having an enlarged head engaging said annular groove, and a retainer comprising a ring bearing against the ends of the rolls, and bent lugs extending between said rolls of greater width than the minimum space therebetween to space and retain said rolls upon said race member, said lugs having cut away or contracted necks providing clearance for said enlargements, and shoulders engaging the inner faces of said enlargements to hold the rolls against said ring.

In testimony whereof I affix my signature in presence of two witnesses.

ROBERT F. BOWER.

Witnesses:
W. J. BELKNAP,
JAMES P. BARRY.

Copies of this patent may be obtained for five cents each, by addressing the "Commissioner of Patents, Washington, D. C."